United States Patent

Birky (10) Patent No.: US 9,506,389 B2
(45) Date of Patent: Nov. 29, 2016

(54) SYSTEM AND METHOD FOR NITRIDING COMPONENTS OF AFTERTREATMENT SYSTEM

(71) Applicant: Caterpillar Inc., Peoria, IL (US)

(72) Inventor: Zachary S. Birky, Washington, IL (US)

(73) Assignee: Caterpillar Inc., Peoria, IL (US)

( * ) Notice: Subject to any disclaimer, the term of this patent is extended or adjusted under 35 U.S.C. 154(b) by 0 days.

(21) Appl. No.: 14/639,161

(22) Filed: Mar. 5, 2015

(65) Prior Publication Data

US 2016/0258333 A1 Sep. 8, 2016

(51) Int. Cl.
*F01N 3/20* (2006.01)

(52) U.S. Cl.
CPC .............. *F01N 3/2066* (2013.01); *F01N 3/208* (2013.01); *F01N 2510/08* (2013.01); *F01N 2610/02* (2013.01)

(58) Field of Classification Search
CPC ....... F28F 19/06; F28F 21/083; F01N 3/208; F01N 2510/08; F01N 2610/02; C23C 8/24
See application file for complete search history.

(56) References Cited

U.S. PATENT DOCUMENTS

| | | | |
|---|---|---|---|
| 5,254,183 A | | 10/1993 | Harris, III et al. |
| 6,024,893 A | * | 2/2000 | Keil .......................... C23C 8/24 148/206 |
| 8,410,003 B2 | | 4/2013 | Ota et al. |
| 2005/0011192 A1 | * | 1/2005 | Ohishi ....................... C23C 2/02 60/602 |
| 2007/0214788 A1 | * | 9/2007 | Sausse .................... F01D 9/045 60/602 |
| 2010/0025500 A1 | | 2/2010 | Pollard et al. |
| 2014/0216423 A1 | | 8/2014 | Mitsubayashi et al. |

FOREIGN PATENT DOCUMENTS

| | | | | |
|---|---|---|---|---|
| ES | 2018375 | | 4/1991 | |
| GB | 1510158 | | 5/1978 | |
| JP | 2014095105 | | 5/2014 | |
| WO | WO 2014140618 A1 | * | 9/2014 | ............... C21D 1/74 |

* cited by examiner

*Primary Examiner* — Audrey K Bradley (57) ABSTRACT

A method for nitriding of at least one component of an aftertreatment system is provided. The method includes passing heated gases through the at least one component of the aftertreatment system. The method also includes heating the at least one component, based on the passage of the heated gases. The method further includes dosing a reductant into the at least one component. The method includes forming a nitride layer on an inner surface of the at least one component, based on the passage of the heated gases and the dosing of the reductant. The method also includes controlling the formation of the nitride layer on the at least one component based on adjusting at least one of the passage of the heated gases or the dosing of the reductant.

19 Claims, 5 Drawing Sheets

FIG. 5 though the at least one component. The nitriding control module is also configured to control nitriding of the at least one component based on the adjustment.

SYSTEM AND METHOD FOR NITRIDING COMPONENTS OF AFTERTREATMENT SYSTEM

TECHNICAL FIELD

The present disclosure relates to a system and method for nitriding, and more particularly to the system and method for providing a nitride layer on components of an aftertreatment system.

BACKGROUND

An aftertreatment system is associated with an engine system. The aftertreatment system is configured to treat and reduce oxides of nitrogen (NOx) and particulate matter present in an exhaust gas flow, prior to the exhaust gas flow exiting into the atmosphere. In order to reduce NOx, the aftertreatment system may include a reductant delivery module, a reductant injector, a Selective Catalytic Reduction (SCR) module, and other associated components.

The reductant injector introduces a reductant into the aftertreatment system. The reductant includes a urea based solution. When the urea based solution is introduced into the aftertreatment system, the aftertreatment components are exposed to free ammonia at temperatures which allow nitrogen pickup during operation. If this pickup is uncontrolled, the properties of the aftertreatment components may change in an unexpected manner, leading to early failure of the aftertreatment components.

U.S. Published Application Number 2014/0216423, hereinafter referred to as the '423 publication, describes an exhaust system part having a high corrosion resistance, an EGR cooler using the exhaust system part, and a method of nitriding the exhaust system part. In the '423 publication, a chromium nitride layer is formed on the inner surface of the exhaust system part. Further, the nitriding process of the single exhaust system part is carried out in a closed space or a furnace. Accordingly, the nitriding process is costly and poses space constraint issues.

SUMMARY OF THE DISCLOSURE

In one aspect of the present disclosure, a method for nitriding of at least one component of an aftertreatment system is provided. The method includes passing heated gases through the at least one component of the aftertreatment system. The method also includes heating the at least one component, based on the passage of the heated gases. The method further includes dosing a reductant into the at least one component. The method includes forming a nitride layer on an inner surface of the at least one component, based on the passage of the heated gases and the dosing of the reductant. The method also includes controlling the formation of the nitride layer on the at least one component based on adjusting at least one of the passage of the heated gases or the dosing of the reductant.

In another aspect of the present disclosure, a system for nitriding of at least one component of an aftertreatment system is provided. The system includes a gas source configured to pass heated gases through the at least one component. The system also includes a reductant dosing module configured to dose a reductant into the at least one component. The system further includes a nitriding control module communicably coupled to the gas source and the reductant dosing module. The nitriding control module is configured to adjust at least one of the passage of the heated gases or the dosing of the reductant through the at least one component. The nitriding control module is also configured to control nitriding of the at least one component based on the adjustment.

In yet another aspect of the present disclosure, a machine is provided. The machine includes an engine, and an aftertreatment system connected to an exhaust conduit of the engine. The machine also includes a temperature sensor positioned upstream of the aftertreatment system. The temperature sensor is configured to generate a signal indicative of a temperature of exhaust gases exiting the engine. The machine further includes a reductant dosing module coupled to the exhaust conduit upstream of the aftertreatment system. The machine also includes a nitriding control module communicably coupled to the temperature sensor and the reductant dosing module. The nitriding control module is configured to receive the signal indicative of the temperature of the exhaust gases. The nitriding control module is also configured to compare the temperature with a predetermined threshold. The nitriding control module is further configured to trigger a formation of a nitride layer on an inner surface of the aftertreatment system based on the comparison.

Other features and aspects of this disclosure will be apparent from the following description and the accompanying drawings.

DETAILED DESCRIPTION

Figure 1:
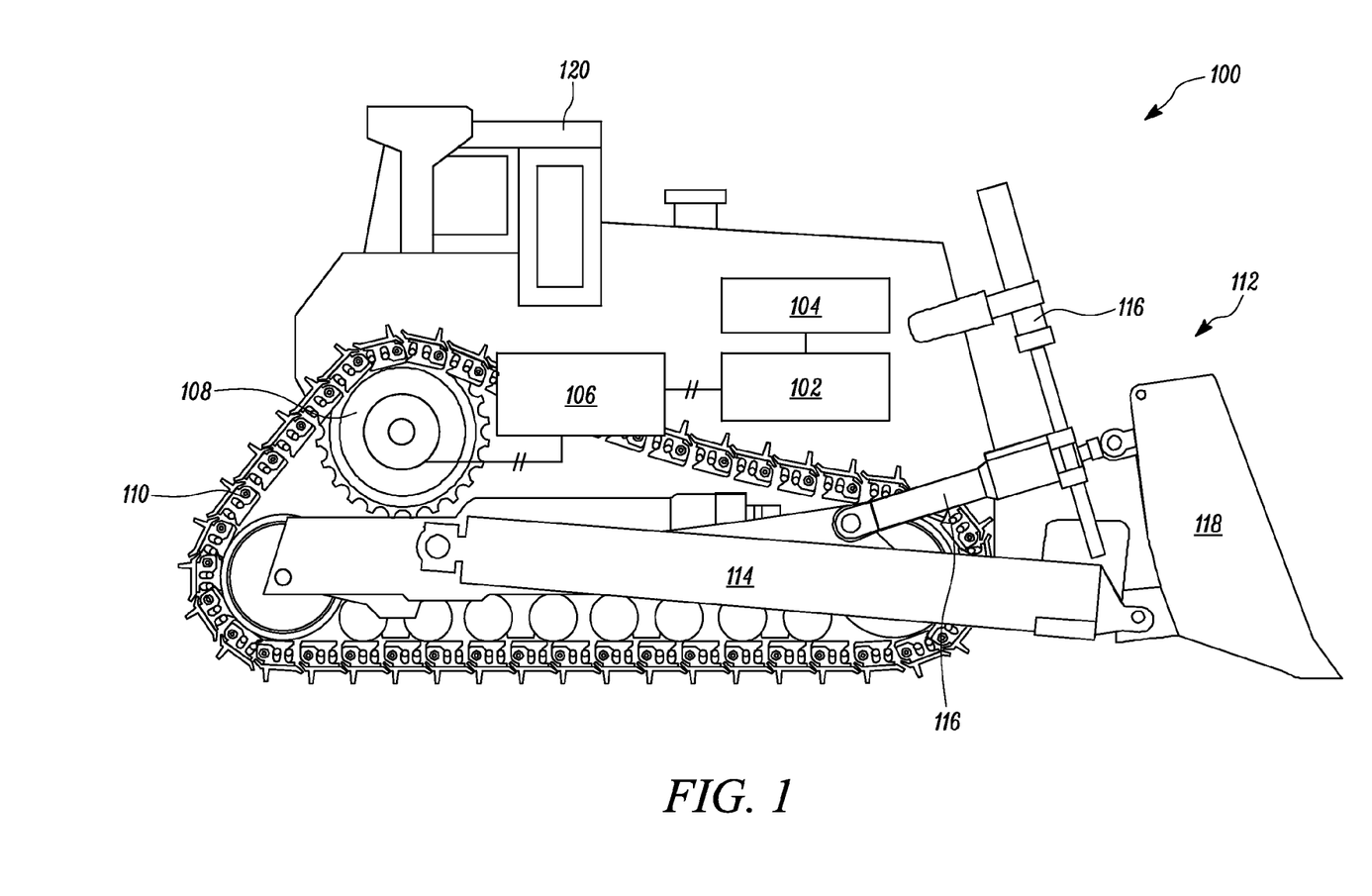
FIG. 1 is a side view of an exemplary machine, according to one embodiment of the present disclosure.

Wherever possible the same reference numbers will be used throughout the drawings to refer to the same or the like parts. FIG. 1 illustrates an exemplary machine 100, according to one embodiment of the present disclosure. As illustrated, the machine 100 may embody a track type tractor. The machine 100 may be a mining truck or may include any off-highway or on-highway vehicle using a fuel-powered engine, as described herein. The machine 100 may include, but is not limited to, a backhoe loader, a skid steer loader, a wheel loader, and a motor grader. It should be understood that the machine 100 may embody any wheeled or tracked machine associated with mining, agriculture, forestry, construction, and other industrial applications.

As illustrated in FIG. 1, the machine 100 may include an engine 102 and an aftertreatment system 104. The machine 100 may also include a transmission system 106 and a propulsion system 108 associated therewith. In one embodiment, the engine 102 may be an internal combustion engine, such as, a reciprocating piston engine or a gas turbine engine. The engine 102 may be a spark ignition engine or a compression ignition engine, such as, a diesel engine, a homogeneous charge compression ignition engine, or a reactivity controlled compression ignition engine, or other compression ignition engines known in the art. The engine 102 may be fueled by gasoline, diesel fuel, biodiesel, dimethyl ether, alcohol, natural gas, propane, hydrogen, combinations thereof, or any other combustion fuel known in the art. The engine 102 may include other components (not shown), such as, a fuel system, an intake system, and so on. The engine 102 may be associated with an industry including, but not limited to, transportation, construction, agriculture, forestry, power generation, and material handling.

Further, the transmission system 106 may be communicably coupled to the engine 102. The transmission system 106 may include coupling elements for transmitting a drive torque from the engine 102 to the propulsion system 108. As illustrated in FIG. 1, the propulsion system 108 may include a track 110 having ground engaging elements configured to propel the machine 100 on the ground.

The machine 100 may include a load lifting assembly 112 having a lift arm 114, one or more hydraulic actuators 116, and a ground engaging tool 118, such as a blade or bucket. The ground engaging tool 118 is configured to collect, hold, and convey material and/or heavy objects on the ground. The hydraulic actuators 116 may be configured to effectuate the movement of the load lifting assembly 112 based on an operator command provided by an operator of the machine 100. The operator command may be received through various input devices present within an operator cabin 120 of the machine 100.

The present disclosure relates to nitriding of one or more components of the aftertreatment system 104 and will be explained in detail in connection with FIGS. 2, 3 and 4.

Figure 2:
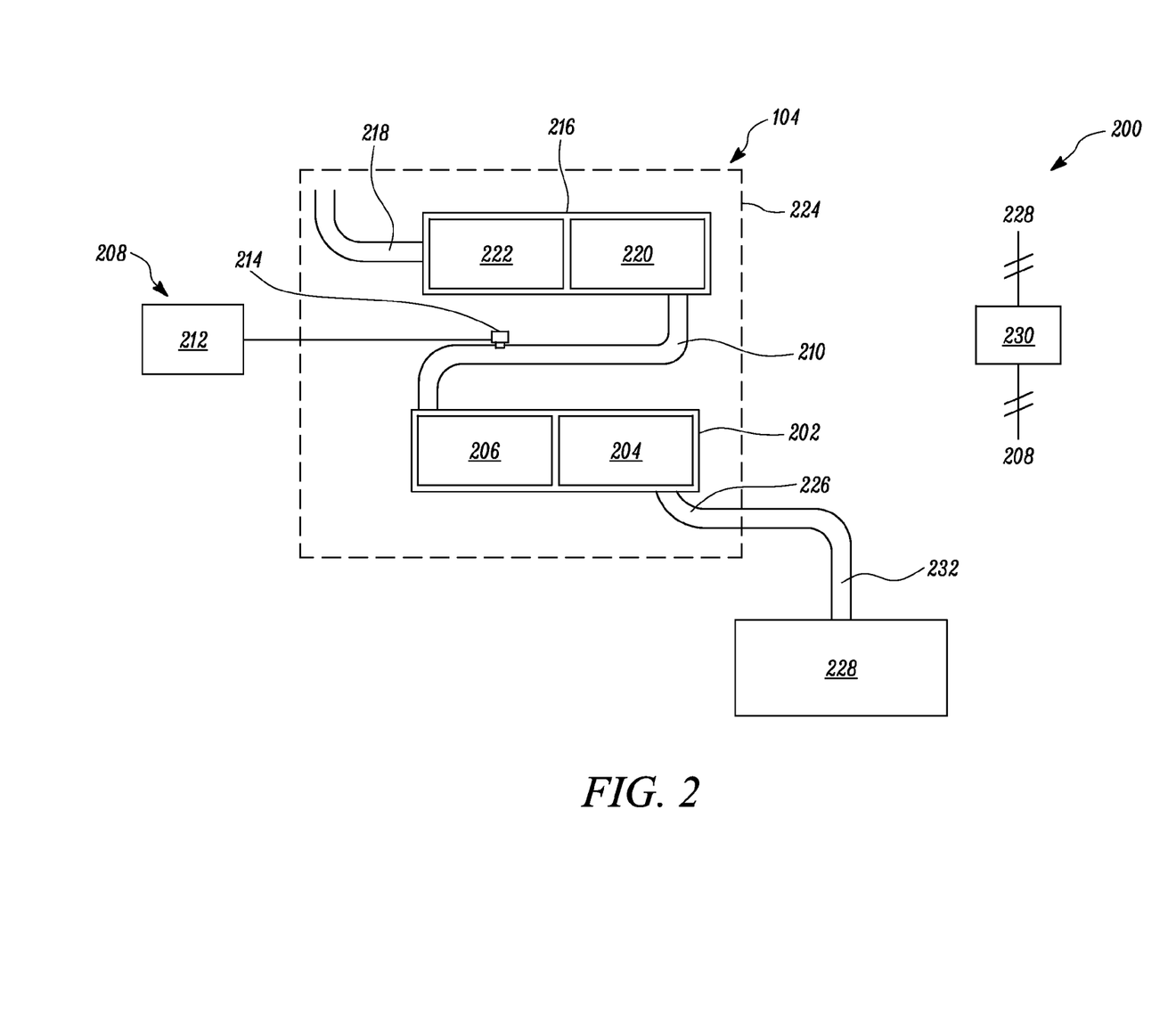
FIG. 2 is a block diagram of an exemplary environment for nitriding a component of an aftertreatment system, according to one embodiment of the present disclosure.
Figure 3:
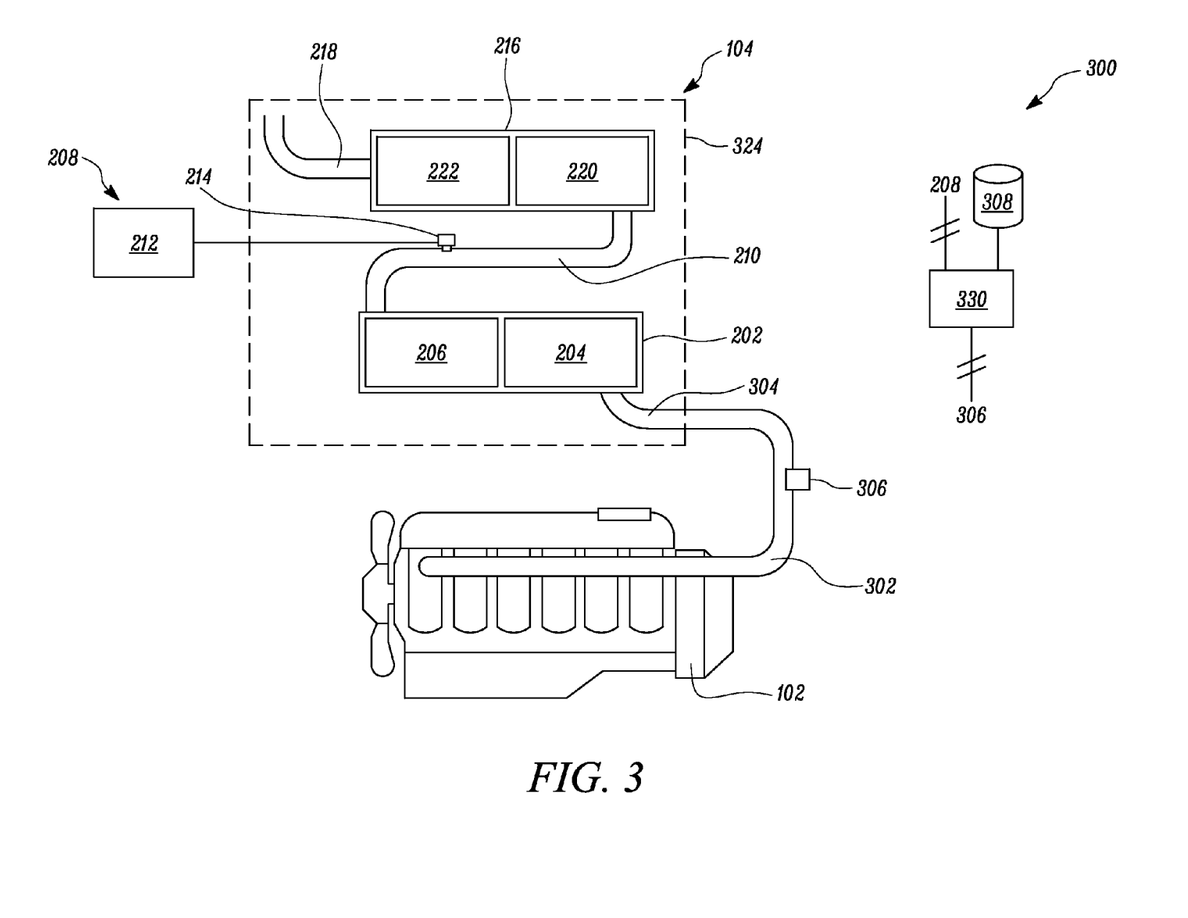
FIGS. 3 and 4 are block diagrams of exemplary environments for nitriding the component of the aftertreatment system, according to various embodiments of the present disclosure.

FIG. 2 illustrates an exemplary environment 200 for nitriding of one or more components of the aftertreatment system 104. Referring to FIG. 2, a portion of the exemplary aftertreatment system 104 is illustrated, according to one embodiment of the present disclosure.

The aftertreatment system 104 is configured to treat an exhaust gas flow exiting the exhaust manifold of the engine 102 (see FIG. 1). The exhaust gas flow contains emission compounds that may include oxides of nitrogen (NOx), unburned hydrocarbons, particulate matter, and/or other combustion products known in the art. The aftertreatment system 104 may be configured to trap or convert NOx, unburned hydrocarbons, particulate matter, combinations thereof, or other combustion products present in the exhaust gas flow, before exiting the engine 102 (see FIG. 1).

In an exemplary embodiment, the aftertreatment system 104 may include a first module 202 containing exhaust gas treatment devices, such as, a Diesel Oxidation Catalyst (DOC) unit 204 and a Diesel Particulate Filter (DPF) unit 206, but other devices may be used. During engine operation, the DOC unit 204 and the DPF unit 206 may be arranged to internally receive engine exhaust gases.

A reductant dosing module 208 is connected to the aftertreatment system 104. A reductant is injected into a transfer conduit 210 of the aftertreatment system 104 by the reductant dosing module 208. The reductant may be a fluid, such as, Diesel Exhaust Fluid (DEF). The reductant may include urea, ammonia, or other reducing agent known in the art.

The reductant dosing module 208 includes a reductant tank 212. The reductant is contained within the reductant tank 212. Further, a reductant injector 214 coupled to the transfer conduit 210 is configured to introduce the reductant into the transfer conduit 210 on operation thereof.

Further, the transfer conduit 210 is configured to fluidly interconnect the first module 202 with a second module 216, and further to a stack 218 connected downstream of the second module 216. The second module 216 may enclose a Selective Catalytic Reduction (SCR) module 220 and an Ammonia Oxidation Catalyst (AMOX) 222. The SCR module 220 operates to treat exhaust gases exiting the engine 102 in the presence of ammonia. The AMOX 222 is used to convert any ammonia slip from the downstream flow of the SCR module 220 before exiting the stack 218.

As discussed above, the present disclosure relates to the nitriding of the one or more components 226, 204, 206, 210, 220, 222, 218 of the aftertreatment system 104 by passage of heated gases therethrough. In one embodiment, the components 226, 204, 206, 210, 220, 222, 218 of the aftertreatment system 104 are assembled together, hereinafter referred to as assembled components 224, prior to passing the heated gases therethrough.

The assembled components 224 of the aftertreatment system 104 may be made of a metal or its alloy. In one example, the assembled components 224 may be made of steel, alloy steel, austenitic steel, Al-coated steel, or other stainless steel. It should be noted that the components 226, 204, 206, 210, 220, 222, 218 of the aftertreatment system 104 disclosed herein is provided as a non-limiting example. It will be appreciated that the aftertreatment system 104 may include other components, and the ordering of the assembled components 224 may differ from that shown in the accompanying figures. These and other variations in aftertreatment system design are possible without deviating from the scope of the disclosure.

The nitriding of the assembled components 224 may be carried out after assembling the components 226, 204, 206, 210, 220, 222, 218 of the aftertreatment system 104. The nitriding may be carried out prior to installing the assembled components 224 on the machine 100 or the engine 102.

For the purpose of the nitriding, a gas source 228 is coupled to the assembled components 224. The gas source 228 may embody any cylinder or reservoir capable of storing gases therein. The gas source 228 is provided in fluid communication with the assembled components 224 of the aftertreatment system 104 through conduits 232, 226 respectively. The gas source 228 is configured to pass the heated gases through the assembled components 224 of the aftertreatment system 104. In one example, the heated gases may include nitrogen gases. In another example, the heated gases may include ammonia gases or a carbon bearing gas, such as, carbon dioxide gas or carbon monoxide gas, but not limited thereto.

The assembled components 224 of the aftertreatment system 104 are configured to heat up when the heated gases pass therethrough. Further, a temperature and amount of the heated gases that pass through the assembled components 224 is selected prior to passing the heated gases through the assembled components 224. The temperature and amount of the heated gas is selected based on the nitride layer to be formed within the assembled components 224. In some examples, the temperature of the heated gases may lie between 400° C. to 550° C. and/or 400° C. to 600° C. In another example, the temperature of the heated gases may be between 400° C. to 475° C., 475° C. to 550° C., 510° C. to 540° C., and/or 550° C. to 600° C.

Further, during the nitriding of the assembled components 224, a fluid is dosed into the assembled components 224, after the passage of the heated gases. In one example, the fluid may include urea, ammonia, carbon, or a combination thereof. The fluid may be directly dosed into the assembled components 224 using appropriate devices by an operator. The fluid may be dosed at multiple locations within the assembled components 224, based on system requirements. In another example, the reductant dosing module 208 of the aftertreatment system 104 may dose the fluid into the assembled components 224. In such an example, the fluid may be the reductant that is introduced into the aftertreatment system 104. The reductant dosed into the assembled components 224 may include urea or ammonia, or a combination thereof. The ammonia may include anhydrous ammonia. An amount of the reductant that is dosed into the assembled components 224 is selected and controlled based on the nitride layer to be formed.

Accordingly, in order to control a formation of the nitride layer formed inside of or on inner surfaces of the assembled components 224 of the aftertreatment system 104, a nitriding control module 230 is provided. The nitriding control module 230 is communicably coupled to the gas source 228 and the reductant dosing module 208. The nitriding control module 230 is configured to control and adjust the passage of the heated gases through the assembled components 224 of the aftertreatment system 104. More particularly, the nitriding control module 230 may adjust the temperature, time duration, and the amount of the heated gases being passed through the assembled components 224. The nitriding control module 230 is also configured to adjust the dosing of the reductant into the assembled components 224 of the aftertreatment system 104. The nitriding control module 230 may adjust the amount and time duration of the dosing of the reductant into the assembled components 224 during the nitriding. The nitriding control module 230 is also configured to control the nitriding of the assembled components 224 based on the adjustments made to the passage of the heated gases, the dosing of the reductant, or both.

When the ammonia present in the reductant comes in contact with the heated assembled components 224, the following reaction may occur:

$$NH_3 \rightarrow [N] + \frac{3}{2} H_2 \qquad \text{Equation (i)}$$

Where:
[N]=nitrogen which is diffused on the inner surfaces of the assembled components 224 of the aftertreatment system 104, thereby forming the nitride layer thereon.

The nitride layer so formed may be controlled or adjusted, based on the adjustments made in relation to the heated gases responsible for the heating of the assembled components 224, the reductant dosed into the assembled components 224 of the aftertreatment system 104, or both. More particularly, a thickness and composition of the nitride layer may depend on various parameters, such as, the temperature of the heated gases, nitriding time, nitride potential, nitriding atmosphere, and/or material of the assembled components 224. The term "nitriding time" refers to the time period between a start and end of a nitriding event. The term "nitriding atmosphere" refers to the atmosphere in which the nitriding proceeds.

The term "nitride potential" ($K_n$) referred to herein may be determined by the following equation:

$$K_n = \frac{P_{NH_3}}{P_{H_2}^{3/2}} \qquad \text{Equation (ii)}$$

Where:
$P_{NH_3}$=partial pressures of the ammonia in atm$^{-1/2}$
$P_{H_2}$=partial pressures of the hydrogen gas in atm$^{-1/2}$ In various embodiments, the nitride potential may range from 0.1 to 100 atm$^{-1/2}$. In one example, the nitride potential may lie between 0.1 and 1.5 atm$^{-1/2}$. In another example, the nitride potential may be 10 atm$^{-1/2}$. In yet another example, the nitride potential may lie between 1 and 5 atm$^{-1/2}$, 5 and 20 atm$^{-1/2}$, or 0.1 and 5 atm$^{-1/2}$.

Further, the parameters such as, the temperature of the heated gases, the nitriding time, the nitride potential, the nitriding atmosphere, and/or the material of the assembled components 224 may be selected to obtain the nitride layer of desired composition. In one embodiment, an expanded austenite layer or a white layer may be formed on the inner surfaces of the assembled components 224 by controlling the parameters associated with the nitriding. Further, the nitriding time may in turn depend upon the temperature of the heated gases and the nitride potential, and varies approximately between 4 hours and 200 hours. In one embodiment, the nitriding time at the temperature of approximately 500° C. or above is approximately 15 hours or less. In another embodiment, the nitride potential at approximately 10 atm$^{-1/2}$ or less is applied in the temperature range of approximately 400° C. and 600° C. during the nitriding. In some embodiments, the nitriding time corresponding to the nitride potential approximately between 0.1 and 1.5 atm$^{-1/2}$ is less than approximately 5 hours–.

After conducting the nitriding of the assembled components 224, the nitrided aftertreatment system may be installed on the machine 100. Although the nitriding process explained above is with reference to the assembled components 224 of the aftertreatment system 104, the disclosure is also applicable for the nitriding of individual components of the aftertreatment system 104. Additionally, in one embodiment, the reductant dosing module 208 may be different from that associated with the aftertreatment system 104.

Alternatively, in another exemplary environment 300, the components 226, 204, 206, 210, 220, 222, 218 of the aftertreatment system 104 are coupled to the engine 102, prior to conducting nitriding thereof. The components 226, 204, 206, 210, 220, 222, 218 of the aftertreatment system 104 that are coupled to the engine 102 are hereinafter referred to as coupled components 324. The components 226, 204, 206, 210, 220, 222, 218 of the aftertreatment system 104 and the reductant dosing module 208 are same as those described above in relation with FIG. 2. The coupled components 324 of the aftertreatment system 104 are fluidly connected to an exhaust conduit 302 of the engine 102, via a conduit 304. In this embodiment, the engine 102 functions as the gas source 228 explained with reference to FIG. 2. Accordingly, the heated gases include the exhaust gases received from the exhaust conduit 302 coupled to the exhaust manifold of the engine 102. During operation of the engine 102, the exhaust gases may flow through the coupled components 324 of the aftertreatment system 104 for conducting the nitriding thereof.

A temperature sensor 306 may be provided in the exhaust conduit 302. The temperature of the exhaust gases exiting the exhaust manifold are measured by the temperature sensor 306. The temperature sensor 306 is positioned upstream of the aftertreatment system 104. More particularly, the temperature sensor 306 may be mounted on the exhaust conduit 302 or the conduit 304. The temperature sensor 306 may embody any known contact type or contactless type temperature measuring device known in the art, without limiting the scope of the present disclosure.

The temperature sensor 306 may be communicably coupled to a nitriding control module 330. During operation of the engine 102, the nitriding control module 330 receives a signal indicative of the temperature of the exhaust gases exiting the engine 102 from the temperature sensor 306. In one example, a database 308 may be communicably coupled to the nitriding control module 330. The database 308 may store information related to the amount of the reductant to be dosed by the reductant dosing module 208, corresponding to a particular temperature of the exhaust gases. Therefore, the nitriding control module 330 may retrieve information from the database 308, compare the retrieved information with the temperature of the exhaust gases, and further send command signals to the reductant dosing module 208 for controlling the amount of the reductant dosed into the coupled components 324 for the formation of the nitride layer.

In another embodiment, the temperature sensor 306 may measure the temperature of the heated coupled components 324 of the aftertreatment system 104 due to the passage of the exhaust gases therethrough. In such an example, based on the temperature of the coupled components 324, the nitriding control module 330 may dose controlled amounts of the reductant into the coupled components 324. It should be noted that the nitriding of the assembled components 224, 324 may be carried out in a production facility under a controlled environment by the operator.

Figure 4:
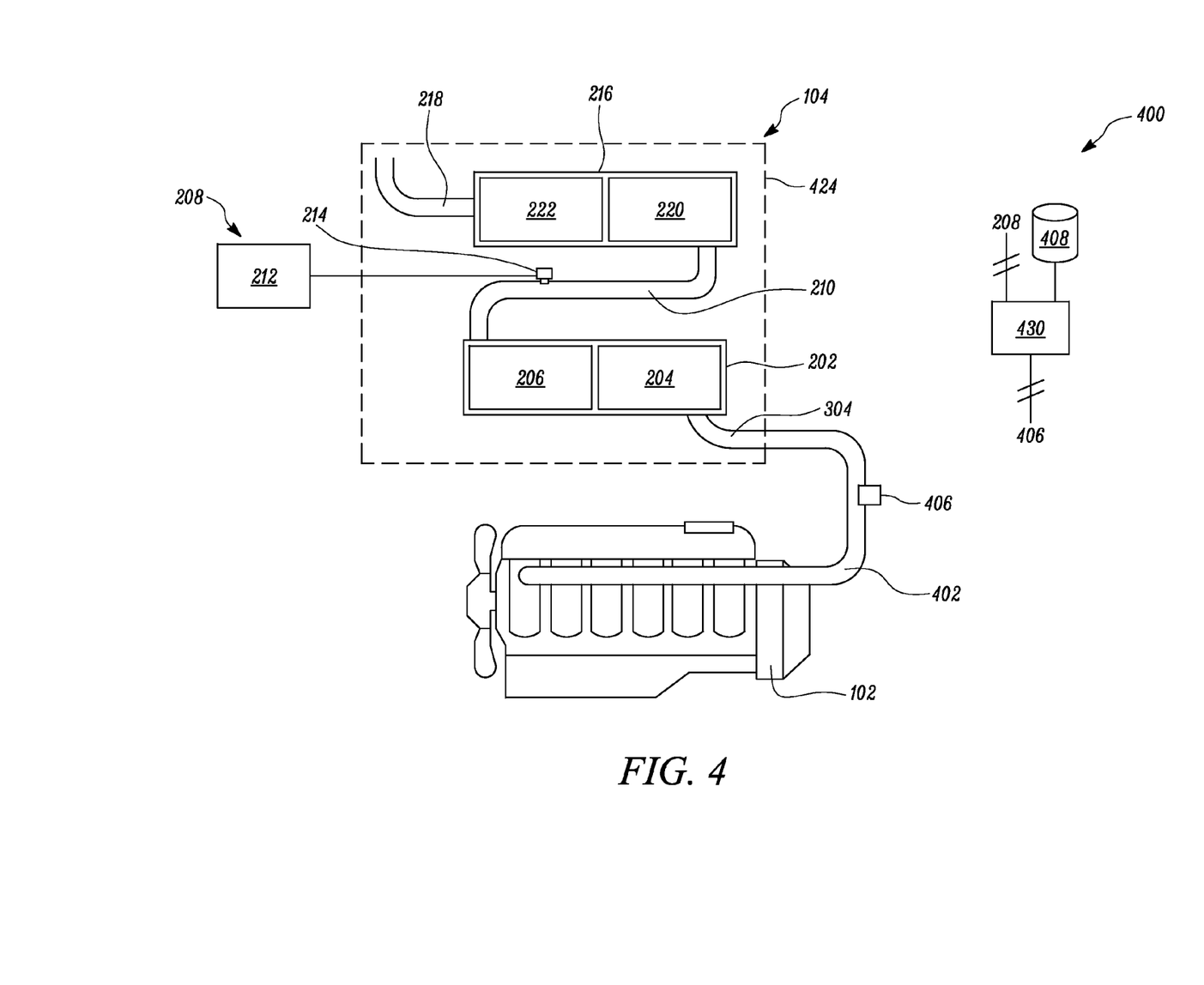

In yet another exemplary environment 400, as shown in FIG. 4, the components 226, 204, 206, 210, 220, 222, 218 of the aftertreatment system 104 may be mounted on to the machine 100, hereinafter referred to as mounted components 424, prior to conducting nitriding thereof. Accordingly, the nitriding of the mounted components 424 may take place in the form of consecutive cycles during machine operation. The heated gases are embodied by the exhaust gases that exit the engine 102.

During machine operation, the exhaust gases pass through the aftertreatment system 104. As the exhaust gases exit the exhaust manifold and flow through an exhaust conduit 402, the exhaust gases come in contact with a temperature sensor 406. The temperature sensor 406 measures and sends the signal indicative of the temperature of the exhaust gases to a nitriding control module 430. In one embodiment, the nitriding control module 430 may be embodied by an electronic control module (ECM) present on the machine 100. The ECM may be configured to perform the functions of the nitriding control module 230, 330 and other machine related functions not described herein.

The nitriding control module 430 may compare the temperature of the exhaust gases received from the temperature sensor 406 with a predetermined threshold. In one example, a database 408 may store the predetermined threshold corresponding to the temperature of the exhaust gases. In the illustrated embodiment, the predetermined threshold corresponds to the temperature of the exhaust gases that may be favorable for the nitriding of the mounted components 424 of the aftertreatment system 104.

The nitriding control module 430 may compare the temperature of the exhaust gases with the predetermined threshold. In a situation wherein the temperature of the exhaust gases is greater than the predetermined threshold, the nitriding control module 430 may trigger the formation of the nitride layer on the mounted components 424. For example, when the exhaust gases reach a temperature of approximately between 400° C. and 450° C. during the machine operation, the nitriding control module 430 may trigger an initial nitriding event. Based on the triggering, the nitriding control module 430 may dose the reductant into the mounted components 424 of the aftertreatment system 104. The initial nitriding event may continue till the temperature of the exhaust gases is favorable for the nitriding. When the temperature of the exhaust gases reduces below the predetermined threshold, the nitriding control module 430 may terminate the initial nitriding event.

Further, for a consecutive nitriding event to be triggered, the temperature of the exhaust gases may either need to be same as the previous nitriding event or different from the previous nitriding event during the next machine operation. Thus, based on the temperature of the exhaust gases, the nitriding of the mounted components 424 of the aftertreatment system 104 may occur at different time instances as needed over the life of the aftertreatment system 104. It should be noted that the ranges given in the present disclosure corresponding to the temperature of the heated gases, the nitride potential, the nitriding environment, and the nitriding time are exemplary in nature, and may vary based on system requirements and the materials used to manufacture the mounted components 424, without limiting the scope of the present disclosure.

Based on the temperature of the exhaust gases, the nitriding control module 430 may adjust and control the dosing of the reductant into the mounted components 424. The reductant may be dosed by the reductant dosing module 208 of the aftertreatment system 104. It should be noted that the nitride layer so formed on the inner surfaces of the components 224, 324, 424 may be controlled by the nitriding control modules 230, 330, 430 respectively as explained in relation with FIG. 2.

The location of the database 308, 408 may vary based on the application. The predetermined thresholds stored within the database 308, 408 may be retrieved from any external source(s) and/or updated on a real time basis. The database 308, 408 may be any conventional or non-conventional database known in the art. Moreover, the database 308, 408 may be capable of storing and/or modifying pre-stored data as per operational and design needs.

The nitriding control module 230, 330, 430 may embody a single microprocessor or multiple microprocessors for receiving signals from various other components other than those described above, and controlling the passing of the heated or exhaust gases and the dosing of the reductant. Numerous commercially available microprocessors may be configured to perform the functions of the nitriding control module 230, 330, 430. It should be appreciated that the nitriding control module 230, 330, 430 may embody a machine microprocessor capable of controlling numerous machine functions. A person of ordinary skill in the art will appreciate that the nitriding control module 230, 330, 430 may additionally include other components and may also perform other functions not described herein.

INDUSTRIAL APPLICABILITY

The present disclosure describes the nitriding of the components 224, 324, 424 of the aftertreatment system 104. The nitriding control module 230, 330, 430 is configured to trigger, adjust, and control the formation of the nitride layer based on the passage of the heated gases, the dosing of the reductant, or both during the nitriding. Therefore the nitride layer so formed may be specific to the requirements of the system. The nitride layer may provide increased resistance to corrosion and wear, without significant increase in cost associated with the nitriding. Further, a less expensive material may be used for manufacturing of the aftertreatment components, as the nitride layer may form a protective layer on the inner surfaces of the aftertreatment components.

The components 226, 204, 206, 210, 220, 222, 218 of the aftertreatment system 104 need not have to be nitrided in a furnace, thereby cutting down costs associated with a large furnace to accommodate the aftertreatment components therein. Also, in a situation wherein the components 226, 204, 206, 210, 220, 222, 218 are individually nitrided and later on welded to form the aftertreatment assembly, the nitride layer so formed may lose its properties at locations where the components 226, 204, 206, 210, 220, 222, 218 are welded. However, as described herein, since the components 226, 204, 206, 210, 220, 222, 218 are nitrided as a single unit after assembly thereof, the properties of the nitride layer is retained even at the weld joints.

Figure 5:
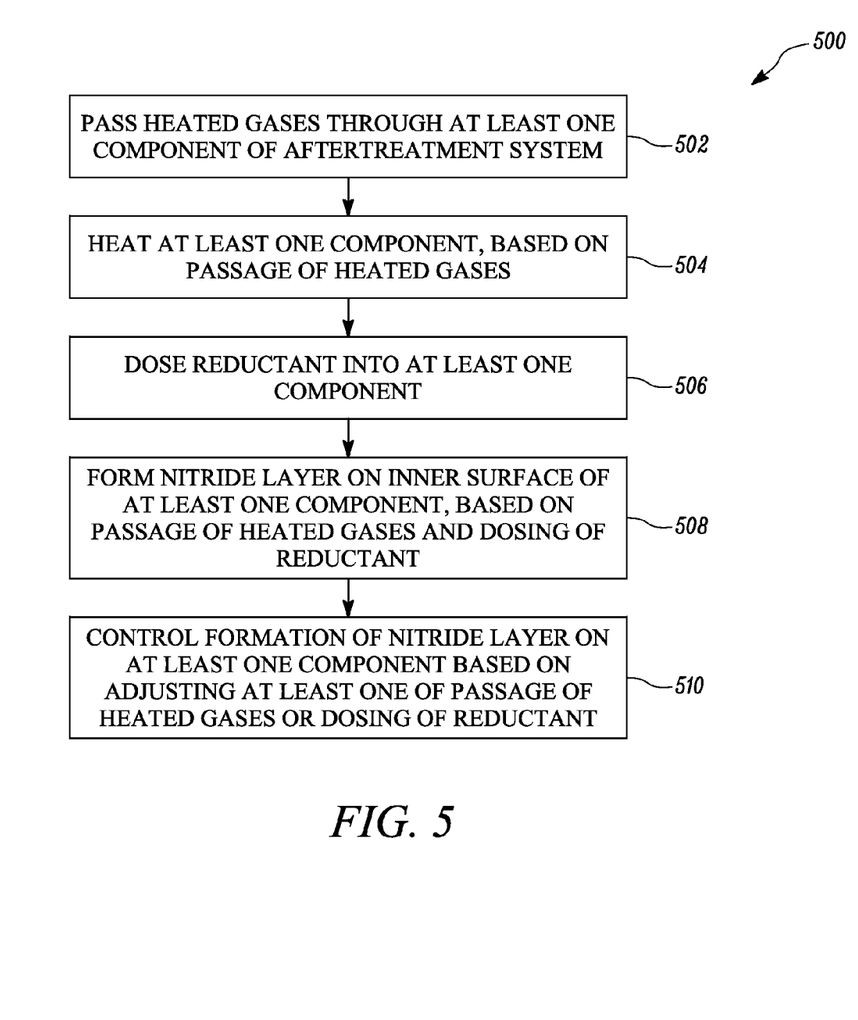
FIG. 5 is a flowchart for a method of nitriding the component of the aftertreatment system.

Referring to FIG. 5, a method 500 for the nitriding of the components 224, 324, 424 of the aftertreatment system 104 is provided. At step 502, the heated gases are passed through the components 224, 324, 424 of the aftertreatment system 104. The heated gases may include exhaust gases, nitrogen gases, carbon bearing gases, and the like. In one embodiment, the temperature of the heated gases is selected prior to passing the heated gases through the assembled components 224, 324, 424, based on the nitride layer to be formed.

The components 224, 324, 424 of the aftertreatment system 104 may be assembled prior to passing the heated gases therethrough. In one embodiment, the components 324, 424 of the aftertreatment system 104 are coupled with the engine 102 prior to passing the heated gases therethrough. In another embodiment, the components 424 are mounted onto the machine 100 prior to passing the heated gases therethrough.

At step 504, the components 224, 324, 424 are heated, based on the passage of the heated gases. At step 506, the reductant is dosed into the components 224, 324, 424. The reductant may include ammonia. At step 508, the nitride layer is formed on the inner surface of the components 224, 324, 424, based on the passage of the heated gases and the dosing of the reductant. At step 510, the formation of the nitride layer on the components 224, 324, 424 is controlled by the nitriding control modules 230, 330, 430 based on adjusting the passage of the heated gases, the dosing of the reductant, or both.

While aspects of the present disclosure have been particularly shown and described with reference to the embodiments above, it will be understood by those skilled in the art that various additional embodiments may be contemplated by the modification of the disclosed machines, systems and methods without departing from the spirit and scope of what is disclosed. Such embodiments should be understood to fall within the scope of the present disclosure as determined based upon the claims and any equivalents thereof.

What is claimed is:

1. A method for nitriding of at least one component of an aftertreatment system, the method comprising:
    assembling the at least one component with the aftertreatment system;
    passing heated gases through the aftertreatment system;
    heating the at least one component, based on the passage of the heated gases;
    dosing a reductant into the at least one component;
    forming a nitride layer on an inner surface of the at least one component, based on the passage of the heated gases and the dosing of the reductant; and
    controlling the formation of the nitride layer on the at least one component based on adjusting at least one of the passage of the heated gases or the dosing of the reductant.

2. The method of claim 1 further comprising:
    selecting a temperature of the heated gases prior to passing the heated gases through the at least one component based on the nitride layer to be formed.

3. The method of claim 1, wherein the heated gases include exhaust gases, nitrogen gases, carbon dioxide gases, or combinations thereof.

4. The method of claim 1, wherein the reductant includes ammonia.

5. The method of claim 1 further comprising:
    coupling the assembled components of the aftertreatment system with an engine prior to passing the heated gases therethrough.

6. The method of claim 5 further comprising:
    mounting the coupled components onto a machine prior to passing the heated gases therethrough.

7. The method of claim 6, wherein the passing step includes:
    passing exhaust gases through the coupled components of the aftertreatment system.

8. The method of claim 7 further comprising:
    receiving a signal indicative of a temperature of the exhaust gases exiting the engine of the machine;
    comparing the temperature with a predetermined threshold; and
    triggering the formation of the nitride layer on the coupled components, based on the comparison.

9. The method of claim 8 further comprising:
    adjusting the dosing of the reductant based on the comparison.

10. A system for nitriding of at least one component of an aftertreatment system, the system comprising:
    a gas source configured to pass heated gases through an assembled aftertreatment system;
    a reductant dosing module configured to dose a reductant into the at least one component; and
    a nitriding control module communicably coupled to the gas source and the reductant dosing module, the nitriding control module configured to:
        adjust at least one of the passage of the heated gases or the dosing of the reductant; and
        control the nitriding of the at least one component based on the adjustment.

11. The system of claim 10, wherein the heated gases include exhaust gases, nitrogen gases, carbon dioxide gases, or combinations thereof.

12. The system of claim 10, wherein the reductant includes ammonia.

13. The system of claim 10, wherein the gas source includes an engine.

14. The system of claim 13 further comprising:
    a temperature sensor positioned upstream of the aftertreatment system, the temperature sensor configured to generate a signal indicative of a temperature of exhaust gases exiting the engine.

15. The system of claim 14, wherein the nitriding control module is further configured to:
    receive the signal indicative of the temperature of the exhaust gases;
    compare the temperature with a predetermined threshold; and
    trigger a formation of a nitride layer on an inner surface of the at least one component based on the comparison.

16. The system of claim 15, wherein the nitriding control module is further configured to:
    adjust the dosing of the reductant based on the comparison.

17. A machine comprising:
an engine;
an aftertreatment system connected to an exhaust conduit of the engine;
a temperature sensor positioned upstream of the aftertreatment system, the temperature sensor configured to generate a signal indicative of a temperature of exhaust gases exiting the engine;
a reductant dosing module coupled to the exhaust conduit upstream of the aftertreatment system; and
a nitriding control module communicably coupled to the temperature sensor and the reductant dosing module, the nitriding control module configured to:
  receive the signal indicative of the temperature of the exhaust gases;
  compare the temperature with a predetermined threshold; and
  trigger a formation of a nitride layer on an inner surface of the aftertreatment system based on the comparison.

18. The machine of claim 17, wherein the nitriding control module is further configured to:
adjust a dosing of a reductant based on the comparison; and
control the formation of the nitride layer on the aftertreatment system based on the adjustment.

19. The machine of claim 17, wherein the reductant includes ammonia.

\* \* \* \* \*